(12) United States Patent
Warren

(10) Patent No.: US 10,416,771 B2
(45) Date of Patent: Sep. 17, 2019

(54) HAPTIC OUTPUT SYSTEM FOR USER INPUT SURFACE

(71) Applicant: Apple Inc., Cupertino, CA (US)

(72) Inventor: Christina E. Warren, San Jose, CA (US)

(73) Assignee: Apple Inc., Cupertino, CA (US)

( * ) Notice: Subject to any disclaimer, the term of this patent is extended or adjusted under 35 U.S.C. 154(b) by 148 days.

(21) Appl. No.: 15/648,263

(22) Filed: Jul. 12, 2017

(65) Prior Publication Data

US 2018/0039331 A1    Feb. 8, 2018

Related U.S. Application Data

(60) Provisional application No. 62/370,516, filed on Aug. 3, 2016.

(51) Int. Cl.
*G06F 3/041* (2006.01)
*G06F 3/043* (2006.01)
*G06F 3/01* (2006.01)
*G06F 3/0354* (2013.01)

(52) U.S. Cl.
CPC .......... *G06F 3/016* (2013.01); *G06F 3/03547* (2013.01); *G06F 3/041* (2013.01); *G06F 3/043* (2013.01); *G06F 2203/04105* (2013.01)

(58) Field of Classification Search
CPC ...... G06F 3/0414; G06F 3/0216; G06F 3/021; G06F 3/02; G06F 3/014; G06F 3/00; G06F 3/0233; G06F 3/0234; G06F 3/0354; G06F 3/033; G06F 3/0412; G06F 2203/04106; G06F 3/016; G06F 3/0202; G06F 3/03547; G06F 3/041; G06F 2203/04105; G08B 6/00; B06B 1/045; B06B 1/0603; B06B 1/06; B06B 1/0644; B06B 1/0688; H01L 41/0906; H01L 41/0933; H01L 41/0926; H01L 41/094; H01L 41/0946; H01L 41/0973; H01L 41/098; H01L 41/0986; H01L 41/113; H01L 41/1134; H01L 41/1136; H01L 41/18; H01L 41/25; H01L 41/27; H01L 41/09
See application file for complete search history.

(56) References Cited

U.S. PATENT DOCUMENTS

| | | |
|---|---|---|
| 8,766,933 B2 | 7/2014 | Makinen et al. |
| 8,854,331 B2 | 10/2014 | Heubel et al. |
| 9,123,258 B2 | 9/2015 | Makinen et al. |
| 9,196,134 B2 | 11/2015 | Levesque et al. |
| 9,323,326 B2 | 4/2016 | Cruz-Hernandez et al. |
| 9,335,823 B2 | 5/2016 | Modarres et al. |
| 9,448,713 B2 | 9/2016 | Cruz-Hernandez et al. |

(Continued)

*Primary Examiner* — Julie Anne Watko
(74) *Attorney, Agent, or Firm* — Brownstein Hyatt Farber Schreck, LLP

(57) ABSTRACT

A haptic output system configured to generate haptic effects, through a user input surface, by varying one or more haptic output characteristics of one or more haptic elements (e.g., vibrating elements, electrostatic elements, thermal elements, and so on) based on substantially real-time touch input and/or force input information. In this manner, the haptic output system effectively simulates the presence of a physical object (e.g., having textures, edges, features, mechanical responses, and so on) on the user input surface.

17 Claims, 11 Drawing Sheets

(56) References Cited

U.S. PATENT DOCUMENTS

| | | | |
|---|---|---|---|
| 2002/0149561 A1* | 10/2002 | Fukumoto | G01C 21/3664 345/156 |
| 2005/0057528 A1* | 3/2005 | Kleen | G06F 3/016 345/173 |
| 2007/0236450 A1* | 10/2007 | Colgate | G06F 3/016 345/156 |
| 2010/0090813 A1* | 4/2010 | Je | G06F 3/016 340/407.2 |
| 2011/0234502 A1* | 9/2011 | Yun | G06F 3/02 345/173 |
| 2011/0260996 A1* | 10/2011 | Henricson | G06F 3/016 345/173 |
| 2011/0285637 A1* | 11/2011 | Karkkainen | G06F 3/016 345/173 |
| 2011/0316798 A1* | 12/2011 | Jackson | G06F 3/016 345/173 |
| 2012/0062516 A1 | 3/2012 | Chen et al. | |
| 2013/0113760 A1* | 5/2013 | Gossweiler, III | G06F 3/016 345/177 |
| 2013/0332892 A1* | 12/2013 | Matsuki | G06F 3/0488 715/863 |
| 2014/0139450 A1* | 5/2014 | Levesque | G06F 3/016 345/173 |
| 2014/0192005 A1 | 7/2014 | Wakuda et al. | |
| 2015/0145657 A1* | 5/2015 | Levesque | G06F 3/016 340/407.2 |
| 2015/0205417 A1* | 7/2015 | Yairi | G06F 3/046 345/173 |
| 2017/0090576 A1 | 3/2017 | Peterson et al. | |

\* cited by examiner

HAPTIC OUTPUT SYSTEM FOR USER INPUT SURFACE

CROSS-REFERENCE TO RELATED APPLICATION

This application claims the benefit under 35 U.S.C. § 119(e) of U.S. Provisional Patent Application No. 62/370,516, filed on Aug. 3, 2016, and entitled "Haptic Output System for User Input Device" the contents of which is incorporated by reference as if fully disclosed herein.

FIELD

Embodiments described herein relate to haptic output systems for electronic devices, and more particularly, to systems and methods for providing haptic output through a user input surface associated with an electronic device.

BACKGROUND

An electronic device can include a vibrating mechanism to provide haptic output to a user. The electronic device can activate the vibrating mechanism to solicit the user's attention, enhance the user's interaction experience with the electronic device, convey information to the user, or for any other suitable purpose.

However, conventional electronic devices incorporating conventional vibrating mechanisms are only capable to provide haptic output in the form of generalized, narrowband vibrations that are decoupled from real-time user input. More specifically, haptic outputs from conventional vibrating mechanisms are attenuated and/or altered based on the manner with which a user holds, or interacts, with the electronic device. As such, these devices are not capable to localize a haptic output to a particular location, provide different haptic outputs at different locations, provide a variety of distinguishable haptic outputs to a user based on real-time user input, or to provide consistent haptic output regardless of the manner with which the user chooses to interact with the electronic device.

SUMMARY

Embodiments described herein generally reference a haptic output system configured to generate haptic effects that simulate the presence of a physical component on a user input surface of an electronic device.

In particular, the haptic output system can be configured to vary one or more haptic output characteristics of one or more haptic elements (e.g., vibrating elements, acoustic elements, electrostatic elements, thermal elements, and so on) based on substantially real-time user touch and user force input to the user input surface. In this manner, the haptic output system effectively simulates multiple tactile responses and/or characteristics that may be exhibited by the physical component sought to be simulated in response to particular user input (e.g., touching the component, feeling the component, pressing the component, and so on). As a result of the various haptic effects provided in response to particular user touch and force input, the haptic output system causes the user to perceive that the physical component is present on the user input surface.

BRIEF DESCRIPTION OF THE FIGURES

Reference will now be made to representative embodiments illustrated in the accompanying figures. It should be understood that the following descriptions are not intended to limit the disclosure to a finite set of preferred embodiments. To the contrary, it is intended that the following description covers alternatives, modifications, and equivalents as may be included within the spirit and scope of the described or depicted embodiments and as defined by the appended claims.

The use of the same or similar reference numerals in different figures indicates similar, related, or identical items.

Figure 1:
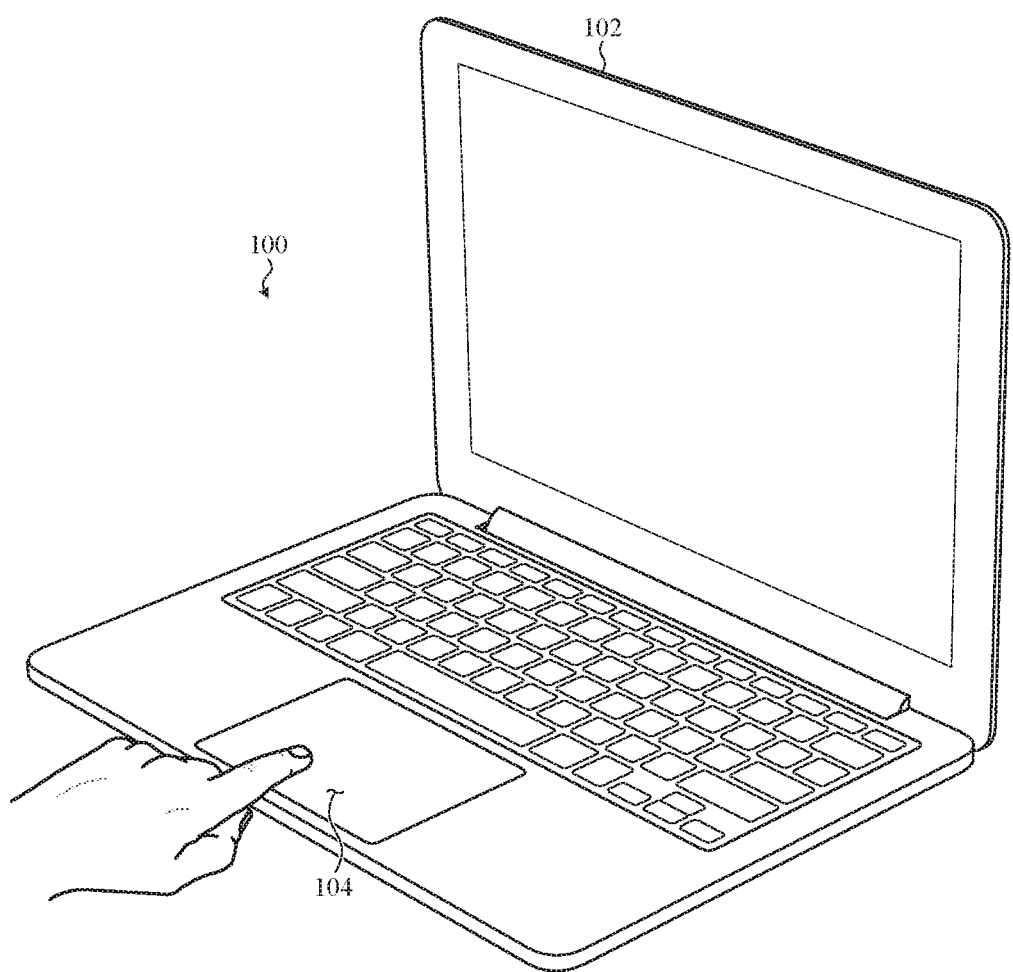
FIG. 1 depicts an electronic device incorporating a user input surface and a haptic output system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein generally reference systems and methods for operating a haptic output system with a user input surface of an electronic device. Typically, the user input surface is an external surface of the electronic device and is configured to receive touch inputs and force inputs from a user. The haptic output system is configured to deliver haptic output to the user, via the user input surface, based on substantially real-time touch and force inputs provided by the user.

As used herein, the phrase "haptic output" broadly encompasses an output provided one or more components of a haptic output system that stimulates a user's sense of touch and/or a user's perception related to the user's sense of touch including, but not necessarily limited to, a sense of surface temperature, a sense of surface topology, a sense of surface friction, a sense of numbness, a sense of mechanical pressure, a sense of mechanical distortion, a sense of motion, a sense of vibration, a sense of stickiness, a sense of slipperiness, a sense of attraction, and so on or any combination thereof. The phrase "haptic output system" as used herein broadly encompasses the components, or groups of components, that may be used by or with an electronic device to stimulate a user's sense of touch and/or affect a user's perception related to the user's sense of touch.

A haptic output system such as described herein is configured to control one or more haptic output characteristics of one or more haptic elements arranged in an array and coupled to, or otherwise in communication with, the user input surface.

A haptic element can be any component or group of components configured to generate a haptic output that can be felt by a user. For example, a haptic element can be configured to move or vibrate the user input surface, affect temperature of the user input surface, affect friction between the user and the user input surface, and so on. Haptic elements can include, but are not limited to, acoustic transducers (e.g., voice coil, piezoelectric element, and so on), thermal elements (e.g., resistive heaters, Peltier elements, and so on), and electrostatic plates. In other cases, other haptic elements or haptic element types may be associated with a haptic output system such as described herein.

Example haptic output characteristics of a haptic element that can be controlled by the haptic output system can include, but are not limited to: frequency, amplitude, duty cycle, envelope, and/or phase of a haptic element configured to move or vibrate the user input surface, such as an piezoelectric transducer; absolute temperature, temperature gradient, and/or relative temperature of a haptic element configured affect temperature of the user input surface, such as a Peltier element; electrostatic field magnitude, frequency, duty cycle, and so on of a haptic element configured affect friction between the user and the user input surface by electrostatic attraction and repulsion; and so on. In other cases, other haptic output characteristics may be controlled or influenced by a haptic output system such as described herein.

In many embodiments, the haptic output system simultaneously actuates different haptic elements with different haptic output characteristics such that the aggregate output of the system is a unique haptic effect is perceivably different from the individual haptic outputs of the actuated haptic elements.

For example, multiple vibrating haptic elements can be actuated simultaneously with different haptic output characteristics (e.g., frequencies, phases, amplitudes, and so on) to produce vibrations that constructively and destructively interfere while propagating through the user input surface. In one implementation of this example, haptic output from one haptic element can be configured to produce vibrations that cancel vibrations produced by another haptic element in order to define a non-vibrating region of the user input surface. In this implementation, the haptic effect generated by the haptic output system can be characterized by the location(s) and boundary(s) of vibrating and non-vibrating regions of the user input surface that result, in aggregate, from the haptic outputs of the individually-actuated haptic elements.

In another implementation of the example referenced above, a set of vibrating haptic elements can each be actuated with specific haptic output characteristics (e.g., frequencies, phases, amplitudes, and so on) that produce vibrations corresponding to frequency components of a finite Fourier series that represents (or approximates) the shape of an arbitrary function (e.g., impulse function, square wave, triangle wave, saw tooth wave, or any other suitable periodic function). The various vibrations produced by the haptic elements constructively and/or destructively interfere while propagating through the user input surface, causing the user input surface to locally deform or displace to take the general shape of the periodic function. In this implementation, the haptic effect generated by the haptic output system can be characterized by the location(s), boundary(s), and contour(s) of the deformations or displacements of the user input surface that result, in aggregate, from the vibrations produced by the haptic outputs of the actuated haptic elements.

In one particular example, an impulse function can be approximated by a sum a sinusoidal waveforms. In this example, a group of haptic elements of a haptic output system associated with a user input surface can be actuated with specific haptic output characteristics (e.g., specific frequencies, phases, and amplitudes) each corresponding to at least one of a particular selected sinusoidal waveform. In this manner, the vibrations in the user input surface produced by each actuated haptic element correspond to at least one respective frequency component of a finite Fourier series that approximates the shape of the an impulse function. In other words, the vibrations cause the user input surface to deform and/or displace to take the shape of an impulse function. In this example, the contours of the impulse function waveform (e.g., edges, peaks, and so on) may be felt by a user touching the user input surface while the haptic elements are actuated by the haptic output system. In this implementation, the haptic effect generated by the haptic output system can be characterized by the location(s), boundary(s), and contour(s) of the sharp and/or defined edges characterized by the impulse waveform-shaped deformation of the user input surface.

In another particular example, a square waveform can be approximated by a sum of odd harmonics of a sinusoidal waveform. In this example, a group of haptic elements of a haptic output system associated with a user input surface can be actuated with specific haptic output characteristics (e.g., specific frequencies, phases, and amplitudes) each corresponding to at least one odd harmonic of a particular selected sinusoidal waveform. In this manner, the vibrations in the user input surface produced by each actuated haptic element correspond to at least one respective frequency component of a finite Fourier series that approximates the shape of the desired square waveform. In other words, the vibrations cause the user input surface to deform and/or displace to take the shape of a square wave. In this example, the contours of the square waveform (e.g., edges, peaks, width, and so on) may be felt by a user touching the user input surface while the haptic elements are actuated by the haptic output system. In this implementation, the haptic effect generated by the haptic output system can be characterized by the location(s), boundary(s), and contour(s) of the square waveform-shaped deformation of the user input surface.

In yet another example, the haptic elements of a haptic output system can be configured to vibrate and/or deform the user input surface in a manner similar to a batter head of a drum, or a Chladli plate, that is configured to vibrate in different modes (e.g., standing waves propagating in two directions). In this example, the vibrations produced by each actuated haptic element can cause the user input surface, or a portion of the user input surface, to enter a specific vibration mode; the vibrations of each actuated haptic element can be independently controlled and may be driven with any suitable waveform or waveform characteristic (e.g., frequency, amplitude, phase, envelope, attack, decay, sustain, release). In this implementation, the haptic effect generated by the haptic output system can be characterized by the location(s), boundary(s), and contour(s) of the various modes of the user input surface.

In further implementations of the examples presented above, additional haptic elements can be actuated to refine or supplement particular haptic effect(s) generated by the haptic output system. For example, an electrostatic plate can generate an electric field that attracts the user's finger to a particular region of the user input surface. An adjacent electrostatic plate may generate an electric field of opposite polarity. In this example, when the user draws a finger from the first electrostatic plate to the second electrostatic plate, a change in friction may be perceived by the user due to the rapid inversion of the electric field magnitude. In this implementation, the haptic effect generated by the haptic output system can be characterized by the location(s), boundary(s), and magnitude(s) of the electrostatic fields generated by the haptic output system of the user input surface.

Further to the example presented above, a haptic output system such as described herein can supplement a haptic effect generated by vibrating haptic elements with a haptic effected generated by one or more electrostatic plates. For example, a haptic effect of an impulse function, perceived by a user as a bump extending from a user input surface, can be supplemented by a haptic effect of a change in friction across the bump extending from the input surface.

In another example, a Peltier element can increase or decrease a temperature of a particular region of the user input surface. For example, a Peltier element can locally increase temperature of a region of the user input surface. An adjacent Peltier element can locally decrease the temperature of a second region of the user input surface. In this example, when the user draws a finger from the first region to the second region, a change in temperature may be perceived by the user. In this implementation, the haptic effect generated by the haptic output system can be characterized by the location(s), boundary(s), and magnitude(s) of the various temperatures generated by the haptic output system.

In further embodiments, a haptic output system can operated and/or configured to produce a series or set haptic effects that are collectively configured to simulate the presence of a physical component (e.g., button, switch, key, rocker, slider, dial, and so on) on the user input surface. In particular, the haptic output system can simulate any arbitrary physical component by associating a set of particular haptic effects with a set of particular combinations of user touch and/or force input. In these examples, each haptic effect generated by the haptic output system simulates a particular tactile response or characteristic exhibited by the physical component when the user interacts with that component in a specific way. In this manner, by simulating multiple tactile responses or characteristics of the physical component in response to particular user input, the haptic output system can cause the user to perceive that the physical component is present on the user input surface.

The phrases "tactile response" and "tactile characteristic" as used herein broadly encompass the various static or dynamic mechanical, physical, or textural attributes or properties that may be exhibited by a physical component when a user interacts with that component by touching, feeling, rotating, tapping, pushing, pulling, pressing, releasing, or otherwise physically interacting with the component in a specific or particular manner. For example, when a user inspects a key of a keyboard, the user can interact with the key in a number of ways (e.g., by touching, pressing, feeling, tapping, and so on), each of which may be associated with different a tactile characteristic or response that informs the user's perception of properties of the key including size, shape, height, texture, material, rigidity, flexibility, and so on. Such interactions might include inspecting a surface or edge of the key by touching or feeling, pressing the key with different magnitudes of force, holding the key in a specific position, sliding a finger across a surface of the key, wiggling the key, and so on. Each of these different interactions can be associated with a different tactile characteristic or response that informs the user's perception that particular key in a unique way. These tactile characteristics and responses can include a sharpness or roundness of an edge of the key, a texture of a surface of the key, a concavity or convexity of the key, a rattle or wobble of the key, a presence or absence of surface features, a stiffness or elasticity of the key, a smoothness or discontinuousness of travel when the key is pressed, a magnitude of force required to actuate the key, and so on.

A haptic output system, such as described herein, can simulate the presence of the key described above at any arbitrary location of a user input surface by generating specific haptic effects in response to specific touch and/or force inputs from a user. In this manner, the haptic output system causes the user to perceive that the key is present on the user input surface.

More particularly, the haptic output system can be configured to generate haptic effects that may be felt by the user when the user provides touch or force input to a selected region of the user input surface. For example, haptic effects can vary dynamically or spatially based on the movement of, and/or force applied by, a user's finger on the user input surface.

Such haptic effects can include: a haptic effect that simulates a sharp edge of a key; a haptic effect that simulates a texture of a smooth surface of a key; a haptic effect that simulates a concavity or convexity of a surface of a key; a haptic effect that simulates a rattle or wobble of a key when the user slides a finger across the key; a haptic effect that simulates a presence or absence of surface features on a key; a haptic effect that simulates a stiffness or elasticity exhibited when a force is applied to a key; a haptic effect that simulates a smoothness or discontinuousness of travel of a key when the user exerts a downward force of a particular magnitude; a haptic effect that simulates a magnitude of force required to actuate a key; and so on. As a result of the different haptic effects provided in response to different user inputs, the user may perceive that the key is present on the user input surface.

In one specific implementation of the example presented above, the haptic output system may be configured to simulate the presence of button of a classical game controller that has a round shape, a concave top surface, and has a spongy feel when pressed within a particular circular region of the user input surface. The haptic output system may be configured to generate a haptic effect of an impulse function, generated by vibrating haptic elements, that is produced in response to a user dragging a finger across a circular region of the user input surface. As a result of the haptic effect produced in response to the location of the user's finger, the user may perceive the location of an edge or perimeter of the button as having a particular location on the user input surface.

In this example, the haptic output system may also be configured to generate a haptic effect of an impulse function, generated by vibrating haptic elements, that is produced in response to a user dragging a finger across the circular region of the user input surface (e.g., across the periphery of the circular region). As a result of the haptic effect produced in response to the location of the user's finger, the user may perceive that the button has particular shape. In other examples, an impulse function may not be used. For example, various haptic elements can be driven with non-sinusoidal waveforms such as, but not limited to: square waves, triangle waves, saw tooth waves, pulse-code modulated waves, other encoded waves, and so on. Different waves may be used to produce different haptic effects (e.g., different textures, different edge characteristics, and so on).

In this example, the haptic output system may also be configured to generate a haptic effect of a rattle or wobble, generated by vibrating haptic elements, that is produced in response to a user dragging a finger within the circular region of the user input surface. The haptic effect may be generated by producing a low-magnitude click that causes the user input surface to perceivably shift. In this example, the direction and/or magnitude of the low-magnitude click can change as the user's finger approaches different quadrants of the circular region of the user input surface. For example, the user input surface may shift laterally to the right if the user's finger is within a right portion of the circular region whereas the user input surface may shift laterally to the left if the user's finger is within a left portion of the circular region. As a result of the haptic effect produced in response to the location of the user's finger, the user may perceive that the button has a characteristic rattle or wobble.

In this example, the haptic output system may also be configured to generate a haptic effect of a high-friction texture, generated by electrostatic plates, that is produced in response to a user dragging a finger within the circular region of the user input surface. As a result of the haptic effect produced in response to the location of the user's finger, the user may perceive that the button has particular texture.

In this example, the haptic output system may also be configured to generate a haptic effect of a click, generated by vibrating haptic elements, that is produced in response to a user pressing downwardly with a force beyond a selected threshold within the circular region of the user input surface. In this example, the magnitude of the click can increase and the duration of the click can decrease as a function of the force with which the user presses the circular region. As a result of the haptic effect produced in response to the magnitude of force applied by the user's finger, the user may perceive that the button responds proportionately to the user's interaction.

The various haptic effects that may be produced by the haptic output system described above may not be exhaustive; additional haptic effects in response to additional user input may be provided in further embodiments to simulate different physical input components, non-input objects or features (e.g., surface characteristics, textures, and so on), or for any other suitable purpose.

Accordingly, generally and broadly, a haptic output system such as described herein can simulate the presence of any arbitrarily-shaped physical component at any location or region of the user input surface. These and other embodiments are discussed below with reference to FIGS. 1-9. However, those skilled in the art will readily appreciate that the detailed description given herein with respect to these figures is for explanatory purposes only and should not be construed as limiting.

Generally and broadly, FIG. 1 depicts an electronic device that operates a haptic output system relative to a user input surface. In the illustrated embodiment, the electronic device is depicted as a laptop computer, although this may not be required of all embodiments and the electronic device can take other forms such as, but not limited to cellular phones, tablet computers, desktop computers, peripheral input devices, industrial control applications, appliances, vehicle or aerospace control systems and so on.

In the illustrated embodiment, the haptic output system may be disposed relative to a user input surface of the electronic device that is responsive to both touch and force input, such as a trackpad. In this configuration, the electronic device can operate the haptic output system to generate or produce haptic effects that can be perceived by a user when the user touches the trackpad. In many cases, the haptic effects generated or produced by the haptic output system are configured to simulate the presence of a physical input component on the user input surface. As noted above, the haptic output system may be configured to produce or generate different haptic effects, by actuating one or more individual haptic elements with particular haptic output characteristics, based on user touch and/or force input to simulate various tactile characteristics or responses of the physical input component. A physical input component can include, but is not limited to, a button, a slider, a dial, a key and so on. In many examples, the haptic output system simulates the presence of the physical input component at a specific location of the user input surface, herein referred to as a "simulation region."

In some cases, more than one physical input component may be simulated at the same time at different simulation regions of the user input surface. In these examples, if a user touches a first location of the user input surface, the user may perceive a haptic effect corresponding to a tactile output characteristic or response of a simulated physical input component. If the user touches a second location of the user input surface, the user may perceive a different haptic corresponding to a different tactile output characteristic or response of a different simulated physical input component.

More specifically, FIG. 1 depicts the electronic device 100 including a housing 102 and a user input surface 104. The user input surface 104 may be associated with, and operated relative to, a haptic output system (not shown). The haptic output system may be positioned above, integrated with, positioned below, or positioned along the periphery of the user input surface 104, although in typical embodiments, the haptic output system is subjacent the user input surface.

The housing 102 can form an outer surface or partial outer surface and protective case for the internal components of the electronic device 100, including the haptic output system. In the illustrated embodiment, the housing 102 is formed in a substantially rectangular shape, although this is not required. The housing 102 can be formed of one or more components operably connected together, such as a front piece and a back piece or a top clamshell and a bottom clamshell. Alternatively, the housing 102 can be formed of a single piece (e.g., uniform body). The housing 102 may be planar, or may be partially or entirely curved. In many embodiments the housing 102 is rigid, although this may not be required; in one embodiment the housing 102 is configured to bend or flex in an elastic manner.

The user input surface 104 may be integrated with one or more touch sensors and/or force sensors that are configured to detect various combinations of user touch and force input to the user input surface 104. The touch and/or force sensors associated with the user input surface 104 may be configured to detect the location of a touch, a magnitude and/or direction of force exerted, and/or a movement of the touch on the user input surface 104.

The touch and/or force sensors associated with the user input surface 104 may be used separately or in combination to interpret a broad range of user inputs such as, but not limited to, touch-based gestures, force-based gestures, touch patterns, tap pattern, single-finger gestures, multi-finger gestures, multi-force gestures, and so on.

The touch and/or force sensors associated with the user input surface 104 may be implemented in any number of suitable ways with any suitable technology or combination of technologies including, but not limited to, self-capacitance touch sensing, mutual capacitance touch sensing, resistive touch sensing, optical touch sensing, acoustic touch sensing, capacitive force sensing, strain-based force sensing, optical force sensing, acoustic force sensing, and so on, or any combination thereof. The touch and/or force sensors may be independently or mutually addressable and may be distributed and/or segmented across the user input surface 104. In other embodiments, the touch and/or force sensors may be disposed relative to a perimeter of the user input surface 104.

The manner by which the haptic output system operates with the user input surface 104 may depend, to a certain extent, on the technology selected to implement the user input surface 104 or the touch and/or force sensors integrated with the user input surface 104; a haptic output system such as described herein may be implemented and/or integrated with a chosen user input surface technology in any suitable manner. One such example configuration is illustrated in FIGS. 2A-2D.

Figure 2A:
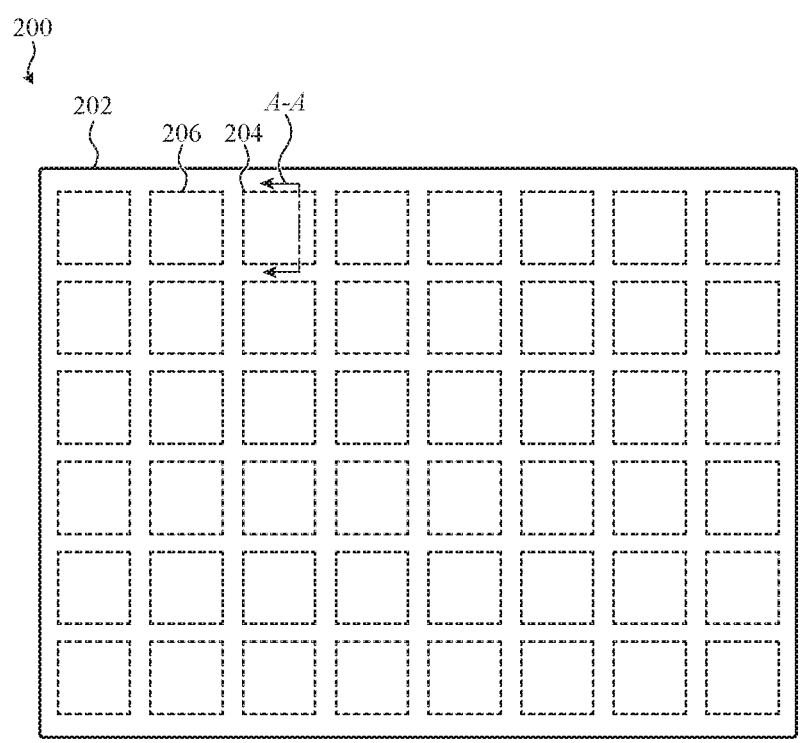
FIG. 2A depicts a plan view of the user input surface of FIG. 1, specifically showing a haptic output system subjacent the user input surface.

Specifically, FIG. 2A depicts a plan view of one example user input surface that may be incorporated by the electronic device 100 shown in FIG. 1. In this embodiment, the haptic output system 200 is disposed below an outer protective layer 202 positioned above the user input surface.

In this embodiment, the haptic output system 200 is segmented. In particular, forty eight individually-addressable elements of the haptic output system 200 are shown. Two of these elements are labeled; the individually-addressable haptic element 204 is positioned relative to the periphery of the user input surface and the individually-addressable element 206 is adjacent to the individually-addressable haptic element 204, along the same periphery.

As noted above, the independently-addressable elements of the haptic output system 200 can be incorporated into the outer protective layer 202 (e.g., cover glass, sapphire, and so on) that protects and encloses other elements of the user input surface. In other cases, the independently-addressable elements of the haptic output system 200 may be incorporated into different layers within a sensor stack (e.g., a stack of layers that collectively form the user input surface) positioned below the outer protective layer 202.

The independently-addressable elements of the haptic output system 200 may each include one or more haptic elements such as, but not limited to, a thermal element, a vibrating element, and an electrostatic plate. In an operating mode, a processor (not shown) associated with the haptic output system 200 can apply an electrical signal to one or more of the haptic elements to actuate the haptic element. Once actuated, the haptic element may generate a haptic output localized to a particular location of the user input surface.

Figure 2B:
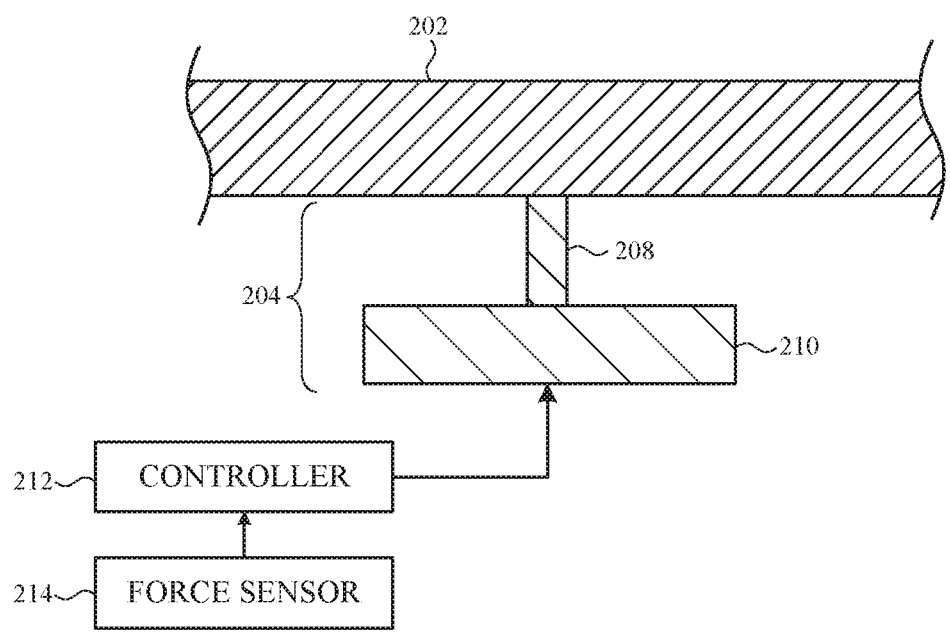
FIG. 2B depicts a simplified cross-section of an addressable element of the haptic output system of FIG. 2A, taken through section line A-A.
Figure 2C:
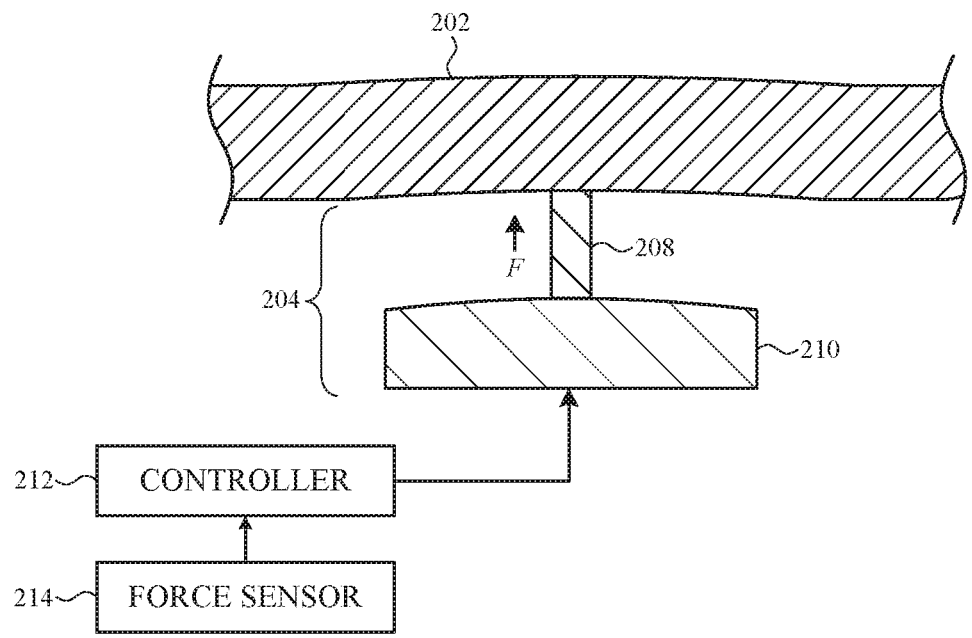
FIG. 2C depicts the addressable element of FIG. 2B, specifically showing the addressable element actuated in response to a signal from a controller.

In some embodiments, such as shown in FIG. 2B, the individually-addressable haptic element 204 is coupled to the outer protective layer 202 by a post 208 to a vibrating element 210. The vibrating element 210 is configured, in an operating mode, to exert a positive (see, e.g., FIG. 2C) or negative magnitude force (see e.g., FIG. 2D) to the outer protective layer 202. In many cases, the post 208 delivers and/or concentrates mechanical output from the vibrating element 210 to a lower surface of the outer protective layer 202. In certain cases, the post 208 can extend through an aperture defined by an intermediate layer (e.g., touch sense layer, force sense layer, display layer, and so on).

The vibrating element 210 can be a piezoelectric element, an acoustic transducer, an electrically deformable material (e.g., nitinol), an electromagnet and attractor plate, or any other suitable element. In other cases, the vibrating element 210 may be an eccentrically weighted motor, linear actuator, or any other suitable mechanical element. For example, the vibrating element 210 may be configured to distort one portion of the outer protective surface outwardly and another portion of the outer protective layer inwardly.

The haptic output system 200 also includes a controller 212. The controller 212 can be a processor and/or electrical circuit appropriately configured to apply a signal to the vibrating element 210 to cause the vibrating element 210 to generate haptic output. The controller 212 can be configured to vary one or more characteristics of the signal (e.g., voltage, current, frequency, amplitude, phase, envelope, duty cycle, and so on) in order to vary the haptic output characteristics of the vibrating element 210.

In many cases, the controller 212 is in communication with one or more components of the user input surface (or an electronic device incorporating the haptic output system 200, such as the electronic device 100 of FIG. 1), such as a force sensor 214. The controller 212 can receive data or information from these components and may alter characteristics of signals provided by the controller 212 to the vibrating element 210 based on the received data or information. For example, the controller 212 can vary characteristics of signals provided by the controller 212 to the vibrating element 210 based on a magnitude of force detected by the force sensor 214.

Figure 2D:
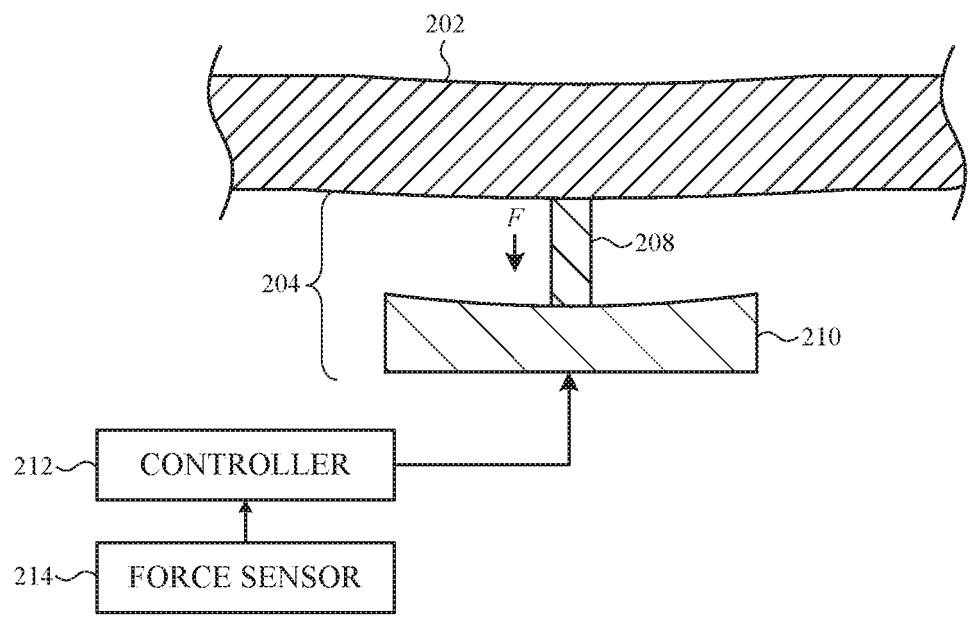
FIG. 2D depicts the addressable element of FIG. 2C, specifically showing the addressable element actuated in response to another signal from the controller

The foregoing description of the embodiment depicted in FIGS. 1-2D, and various alternatives thereof and variations thereto are presented, generally, for purposes of explanation, and to facilitate a thorough understanding of the detailed embodiments presented herein. However, it will be apparent to one skilled in the art that some of the specific details presented herein may not be required in order to practice a particular described embodiment, or an equivalent thereof.

Thus, it is understood that the foregoing and following descriptions of specific embodiments of a haptic output system are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings. Particularly, it may be understood that the various components of the individually-addressable elements of the haptic output system depicted in FIGS. 1-2D can be implemented in a number of suitable and implementation-specific ways.

Generally and broadly, FIGS. 3A-3D are provided in reference to a haptic output system such as described herein that incorporates a row of individually-addressable haptic elements, such as the vibrating element 210 depicted in FIGS. 2A-2D.

Figure 3A:
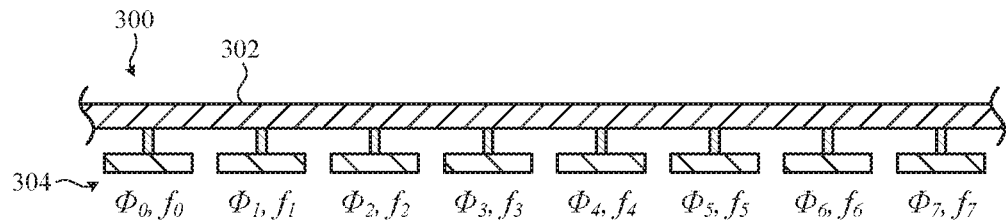
FIG. 3A depicts a cross-section of a portion of a haptic output system such as described herein.

In particular, FIG. 3A depicts a simplified cross-section of the haptic output system 300. In this example, haptic output system 300 includes a row of individually addressable haptic elements positioned below a user input surface 302. One haptic element of the row of individually addressable haptic elements is identified as the haptic element 304.

As noted with respect to other embodiments described herein, the haptic output system 300 is configured to control one or more haptic output characteristics of one or more of the individually addressable haptic elements.

As noted with respect to other embodiments described herein, the piezoelectric elements can be any component or group of components configured to generate a haptic output that can be felt by a user. For example, the haptic element 304 can be configured to move or vibrate the user input surface 302, affect temperature of the user input surface 302, affect friction between the user and the user input surface 302, and so on. Example haptic elements can include, but are not limited to, acoustic transducers (e.g., voice coil, piezoelectric element, and so on), thermal elements (e.g., resistive heaters, Peltier elements, and so on), and electrostatic plates. In other cases, other haptic elements or haptic element types may be associated with the haptic output system 300. For simplicity of illustration and description of the example embodiment depicted in FIG. 3A, the haptic element 304 is shown as a haptic element configured to vibrate (e.g., a piezoelectric element, an acoustic transducer, an electrically deformable material, an electromagnet and attractor plate, or any other suitable element).

Example haptic output characteristics of the haptic element 304 that can be controlled by the haptic output system 300 can include, but are not limited to frequency, amplitude, duty cycle, envelope, and/or phase. In many cases, these (and other) haptic output characteristics can be controlled by changing one or more characteristics of an electrical signal configured to actuate the haptic element 304. Example characteristics of an electrical signal configured to actuate the haptic element 204 include, but are not limited to: frequency, voltage, amplitude, current, duty cycle, envelope, phase, and so on.

In many embodiments, the haptic output system 300 simultaneously actuates different haptic elements with different haptic output characteristics such that the aggregate output of the system is a unique haptic effect is perceivably different from the individual haptic outputs of the actuated haptic elements.

For example, multiple vibrating haptic elements can be actuated simultaneously with different haptic output characteristics (e.g., frequencies, phases, amplitudes, and so on) to produce vibrations that constructively and destructively interfere while propagating through the user input surface 302. In one implementation of this example, a first haptic output from a first element can be configured to produce vibrations with a first frequency $F_1$ and a first phase $\Phi_1$. Simultaneously, a second haptic output from a second haptic element can be configured to produce vibrations with a second frequency $F_2$ and a second phase $\Phi_2$. The second haptic output can be configured to cancel the first haptic output in order to define a non-vibrating region of the user input surface 302. In this implementation, the haptic effect generated by the haptic output system 300 can be characterized by the location(s) and boundary(s) of vibrating and non-vibrating regions of the user input surface 302 that result, in aggregate, from the haptic outputs of the individually-actuated haptic elements.

In another implementation of the example referenced above, a set of vibrating haptic elements can each be actuated with specific haptic output characteristics (e.g., frequencies, phases, amplitudes, and so on) that produce vibrations corresponding to frequency components of a finite Fourier series that represents (or approximates) the shape of an arbitrary function (e.g., impulse function, square wave, triangle wave, saw tooth wave, or any other suitable periodic function).

Figure 3B:
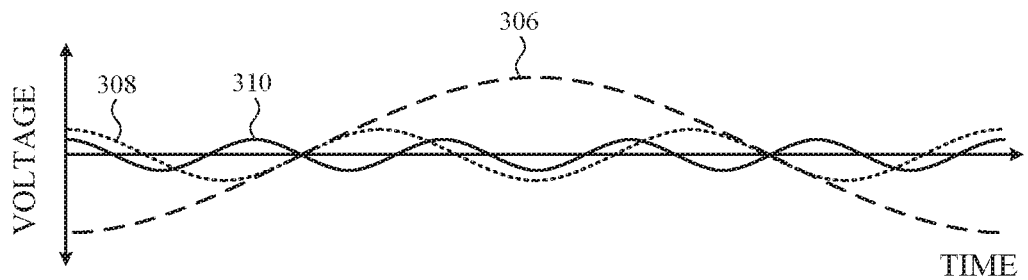
FIG. 3B is a simplified graph depicting a set of signals that can be applied by a controller to independently actuate addressable elements of the haptic output system of FIG. 3A.

In one particular example, the set of vibrating haptic elements are actuated with specific haptic output characteristics (e.g., specific frequencies, phases, and amplitudes) such that each corresponds to one frequency component of a Fourier series that approximates a square wave. It may be appreciated that a square wave is merely one example; any arbitrary periodic function can be produced using the techniques described herein. More specifically, as shown in FIG. 3B, a first haptic output from a first element can be configured to produce vibrations with a first frequency $F_1$ and a first phase $\Phi_1$. The first haptic output can be generated in response to a voltage signal 306. A second haptic output from a second haptic element can be configured to produce vibrations with a second frequency $F_2$ and a second phase $\Phi_2$. The second haptic output can be generated in response to a voltage signal 308. In addition, a third haptic output from a third haptic element can be configured to produce vibrations with a third frequency $F_3$ and a third phase $\Phi_3$. The third haptic output can be generated in response to a voltage signal 310.

Figure 3C:
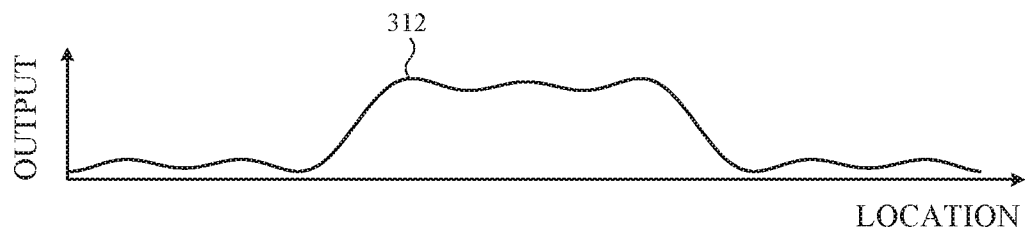
FIG. 3C is a simplified graph corresponding to the aggregate haptic output the haptic output system resulting from actuation of the addressable elements as depicted in FIG. 3B.
Figure 3D:
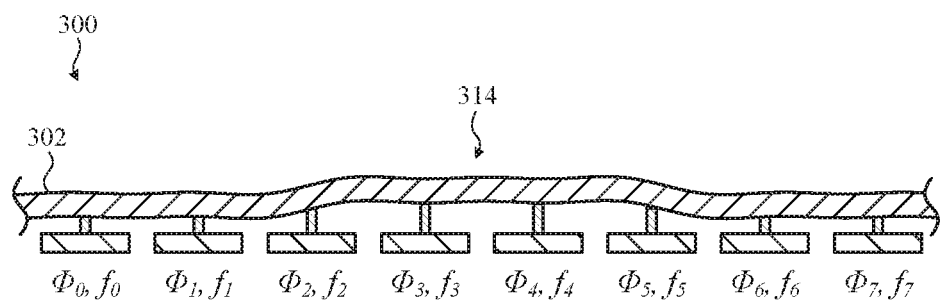
FIG. 3D depicts the haptic output system of FIG. 3A providing the haptic output shown in FIG. 3C.

As shown in FIGS. 3C-3D, the various vibrations produced by the haptic elements constructively and destructively interfere while propagating through the user input surface 302, causing the user input surface 302 to locally deform or displace to take the general shape of the square wave 312. In this implementation, the haptic effect generated by the haptic output system 300 can be characterized by the location(s), boundary(s), and contour(s) of the deformations or displacements of the user input surface 302 that result, in aggregate, from the vibrations produced by the haptic outputs of the actuated haptic elements. In other words, the vibrations cause the user input surface 302 to deform and/or displace to take the shape of a square wave deformation 314. In this example, the contours of the square wave deformation 314 (e.g., edges, peaks, width, and so on) may be felt by a user touching the user input surface 302 while the haptic elements are actuated by the haptic output system 300.

As with other embodiments, the foregoing description related to the embodiments depicted in FIGS. 3A-3D, and various alternatives thereof and variations thereto are merely presented for purposes of explanation. It will be apparent to one skilled in the art that some of the specific details presented herein may not be required in order to practice a particular described embodiment, or an equivalent thereof. Thus, it is understood that the foregoing and following descriptions of specific embodiments are presented for the limited purposes of illustration and description. These descriptions are not targeted to be exhaustive or to limit the disclosure to the precise forms recited above. To the contrary, it will be apparent to one of ordinary skill in the art that many modifications and variations are possible in view of the above teachings.

Figure 4:
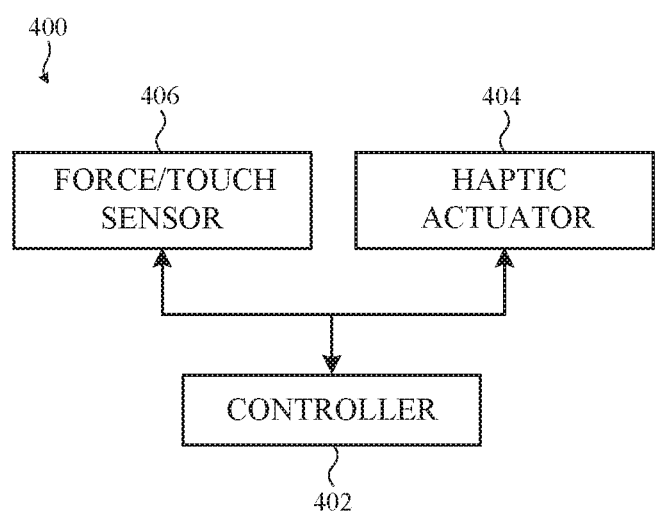
FIG. 4 depicts a simplified system diagram of a haptic output system associated with a force-responsive input surface

FIG. 4 depicts a system diagram of an example haptic output system 400. The haptic output system 400 includes a controller 402 such as a processor that is coupled to a haptic actuator 404 (or haptic element), such as an electrostatic plate, a vibrating haptic element, and a thermal transducer. The controller 402 is also coupled to a sensor 406 or set of sensors configured to detect a magnitude, location, and/or direction of force input and touch input to a user input surface.

The controller 402 can be implemented as any electronic device capable of processing, receiving, or transmitting data or instructions. For example, the controller 402 can be a microprocessor, a central processing unit, an application-specific integrated circuit, a field-programmable gate array, a digital signal processor, an analog circuit, a digital circuit, or combination of such devices. The processor may be a single-thread or multi-thread processor. The processor may be a single-core or multi-core processor. Accordingly, as described herein, the phrase "processing unit" or, more generally, "processor" refers to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

The controller 402, in many embodiments, can include or can be communicably coupled to circuitry and/or logic components, such as a dedicated processor and a memory. The circuitry of the controller 402 can perform, coordinate, and/or monitor one or more of the functions or operations associated with the haptic output system 400 including, but not limited to: increasing the temperature of an area of a user input surface; decreasing the temperature of an area of a user input surface; decreasing the temperature surrounding an area of a user input surface; increasing the temperature surrounding an area of a user input surface; detecting, approximating, and/or measuring the temperature of an area of a user input surface; increasing the friction exhibited by an area of a user input surface; decreasing the friction exhibited by an area of the user input surface; increasing the friction exhibited surrounding an area of a user input surface; decreasing the friction exhibited surrounding an area of a user input surface; increasing a vibration emanating from a local area of a user input surface; decreasing a vibration output from one or more haptic actuators; generating a vibration that constructive interferes with a vibration propagating through an area of a user input surface; generating a vibration that destructively interferes with a vibration propagating through an area of a user input surface; measuring, estimating and/or determining a frequency, amplitude and/or phase of a vibration propagating through an area of a user input surface; and so on or any combination thereof. In some examples, the controller 402 may use time multiplexing techniques to obtain measurements from and to apply signals to each independent element of each portion of a haptic output system 400.

In further embodiments, a haptic output system, such as the haptic output system 400, can operated and/or configured to produce a series or set haptic effects that are collectively configured to simulate the presence of a physical component, a physical boundary, a physical texture, and so on at one or more locations or regions of the user input surface.

In particular, as noted above, the haptic output system can simulate any arbitrary physical component by associating a set of particular haptic effects with a set of particular combinations of user touch and/or force input. In these examples, each haptic effect generated by the haptic output system simulates a particular tactile response or characteristic exhibited by the physical component when the user interacts with that component in a specific way. In this manner, by simulating multiple tactile responses or characteristics of the physical component in response to particular user input, the haptic output system can cause the user to perceive that the physical component is present on the user input surface.

Figure 5:
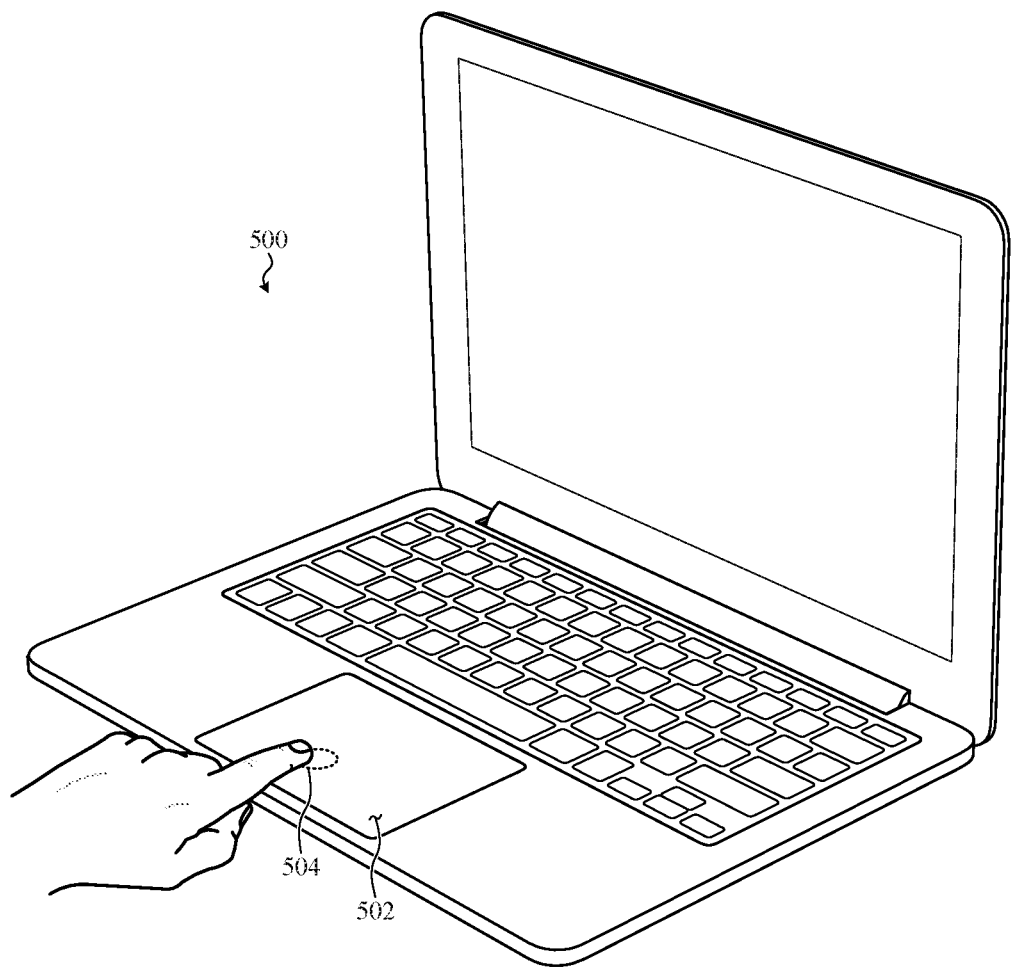
FIG. 5 depicts an electronic device incorporating a haptic output system into a user input surface.

For example, FIG. 5 depicts an electronic device 500 that includes a user input surface 502. The user input surface 502 can be associated with a haptic output system (not shown) such as describe herein. As noted above, the haptic output system can be appropriately configured to simulate a physical component, boundary, texture, or object by generating haptic effects (e.g., combinations of haptic outputs) that cause a user to perceive the presence of the physical component, boundary, texture, or object.

In these embodiments, the user input surface 502 is configured to detect touch and force input from a user. More specifically, the user input surface 502 can be configured to detect a location of a touch event, a magnitude of force exerted during a touch event, a gesture or pattern of a touch event, a change in a touch location over time, a change in a magnitude of force exerted during a touch event, and so on.

In one example, the haptic output system is configured to simulate the presence of a rounded button at an arbitrary location of a user input surface 502 by generating specific haptic effects in response to specific touch and/or force inputs from a user. In this manner, the haptic output system causes the user to perceive that the simulated rounded button 504 is physically present on the user input surface.

More particularly, the haptic output system can be configured to generate haptic effects that may be felt by the user when the user provides touch or force input to a selected region of the user input surface 502. Such haptic effects can include, but may not be limited to: a haptic effect that simulates a sharp edge of the simulated rounded button 504; a haptic effect that simulates a texture of a smooth surface of the simulated rounded button 504; a haptic effect that simulates a concavity or convexity of a surface of the simulated rounded button 504; a haptic effect that simulates a rattle or wobble of the simulated rounded button 504 when the user slides a finger across the rounded button 504; a haptic effect that simulates a presence or absence of surface features on the simulated rounded button 504; a haptic effect that simulates a stiffness or elasticity exhibited when a force is applied to the simulated rounded button 504; a haptic effect that simulates a smoothness or discontinuousness of travel of the simulated rounded button 504 when the user exerts a downward force of a particular magnitude; a haptic effect that simulates a magnitude of force required to actuate the simulated rounded button 504; and so on. As a result of the different haptic effects provided in response to different user inputs, the user may perceive that the rounded button 504 is present on the user input surface.

Figure 6A:
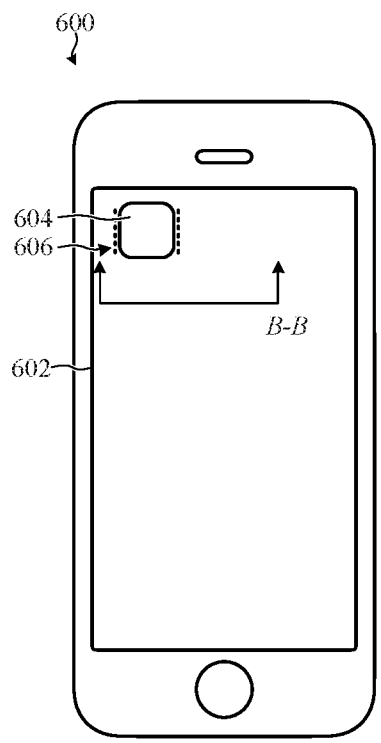
FIG. 6A depicts another electronic device incorporating a haptic output system into a user input surface.

In other embodiments, a haptic output system can be incorporated into a different electronic device. For example, FIG. 6A depicts a handheld device 600 that includes a user input surface 602. The user input surface 602 can be associated with a haptic output system (not shown) such as describe herein. As noted with respect to other embodiments described herein, the haptic output system can be appropriately configured to simulate a physical component, boundary, texture, or object by generating haptic effects (e.g., combinations of haptic outputs) that cause a user to perceive the presence of the physical component, boundary, texture, or object. As with other embodiments described herein, the user input surface 602 is configured to detect touch and force input from a user.

In this example, the user input surface 602 is associated with a display of the handheld device 600. The user input surface 602 can be positioned behind the display, in front of the display, or can be integrated within the display. The display can be implemented with any suitable display technology.

The display may be configured to generate a user interface. The haptic output system may be configured to generate haptic effects that correspond to elements shown within the user interface. For example, in one embodiment the user interface can show an icon 604. The icon 604 may be selectable by the user and may, when selected, cause the handheld device 600 to perform a certain task, such as launching an application.

Figure 6B:
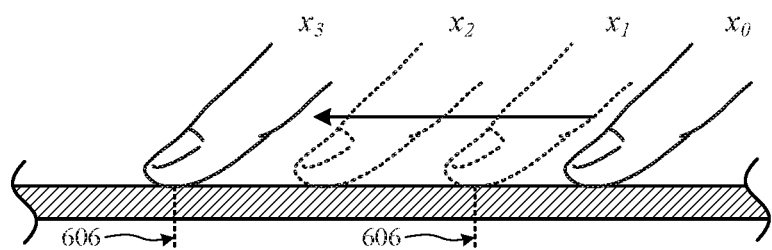
FIG. 6B depicts the electronic device of FIG. 6A viewed along the section-line B-B.

In this example, the haptic output system can be configured to simulate some or all of the borders of the icon 604 via the user input surface 602 by generating specific haptic effects in response to specific touch and/or force inputs from a user. Particularly, the right and left borders 606 are identified, although it may be appreciated that all borders of the icon 604 can be simulated. In this manner, the haptic output system causes the user to perceive that the simulated rounded button 604 is physically present on the user input surface. More particularly, as shown in FIG. 6B, as a user drags a finger across the user input surface 602, different haptic effects may be generated depending upon the location of the user's finger, the path of the user's finger, the force applied by the user's finger, the speed of the user's finger, and so on.

For example, when the user's finger is in a first location $x_0$, a first haptic effect can be generated. In one example, the first haptic effect is characterized by an absence of haptic output (e.g., if the user touches the user input surface 602 at the at the first location $x_0$, no haptic output is provided). In another example, the first haptic effect is characterized based on the distance between the first location $x_0$ and another location of the user input surface. For example, an amplitude or frequency of one or more haptic outputs that correspond to the first haptic effect can be based on a distance between the first location $x_0$ and a user interface element such as the icon 604.

In many cases, when the user's finger moves from the first location $x_0$ to a second location $x_1$, a different haptic effect can be provided (e.g., a second haptic effect). For example, in one embodiment, the second haptic effect is characterized by an impulse function that is structured and/or generated to simulate the tactile characteristics of an edge or border of the icon 604, such as the right border 606. As a result of the transition between the first haptic effect and the second haptic effect, the user may perceive an edge of the icon 604 is present when the user's finger is dragged across the second location $x_1$. When the user's finger moves from the second location $x_1$ to a third second location $x_2$, a third haptic effect can be provided. The third haptic effect can correspond to a tactile characteristic of the top surface of the icon 604. Similarly, when the user's finger moves from the third location $x_2$ to a fourth location $x_3$, a fourth haptic effect can be provided. The fourth haptic effect can be similar to the second haptic effect and may correspond to an edge of the icon 604.

Figure 7:
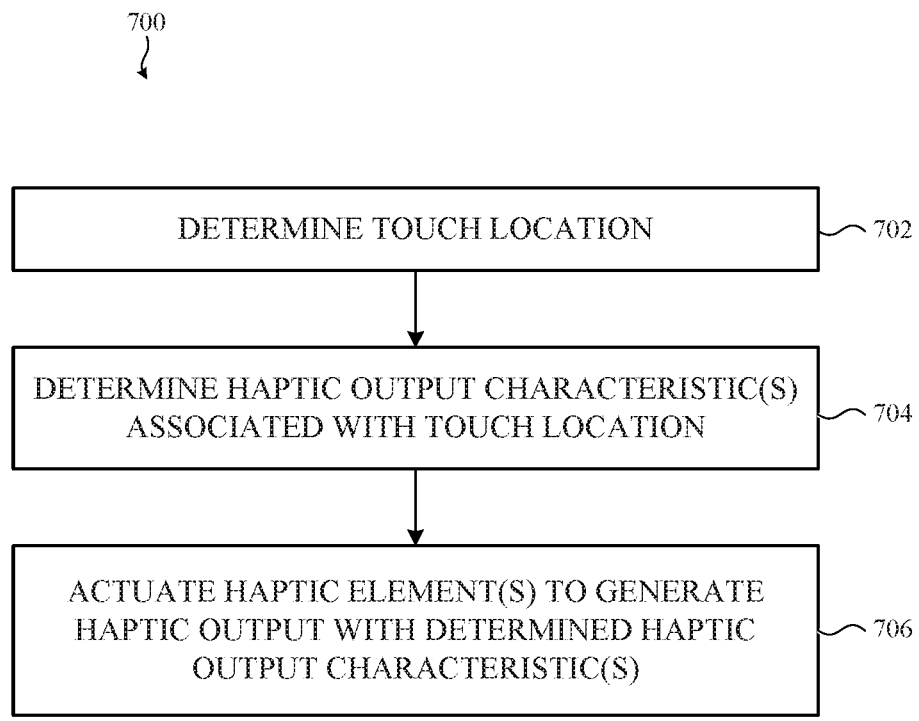
FIG. 7 is a flowchart depicting example operations of a method of providing haptic output using a haptic output system.

FIG. 7 is a flowchart depicting example operations of a method of providing haptic output using a haptic output system. The method depicted can, in some embodiments, be performed (at least in part) by the controller 402 depicted in FIG. 4. In other cases, the method is performed by another processor or circuit, or combination of processors or circuits.

The method 700 beings at operation 702 in which a touch location is determined. Typically, the touch location is quantified relative to a coordinate system describing a user input surface of an electronic device.

Once the touch location is determined, haptic output characteristic(s) associated with that touch location can be determined at operation 704. As noted with respect to other embodiments described herein, example haptic output characteristics that can be controlled by the haptic output system can include, but are not limited to: frequency, amplitude, duty cycle, envelope, and/or phase of a haptic element configured to move or vibrate the user input surface, such as an piezoelectric transducer; absolute temperature, temperature gradient, and/or relative temperature of a haptic element configured affect temperature of the user input surface, such as a Peltier element; electrostatic field magnitude, frequency, duty cycle, and so on of a haptic element configured affect friction between the user and the user input surface by electrostatic attraction and repulsion; and so on.

Next, at operation 706, one or more haptic elements can be actuated in a manner that causes those haptic elements to generate haptic output corresponding to the determined haptic output characteristics. In this manner, haptic output and/or haptic effects can be provided by a haptic output system such as described herein.

Figure 8:
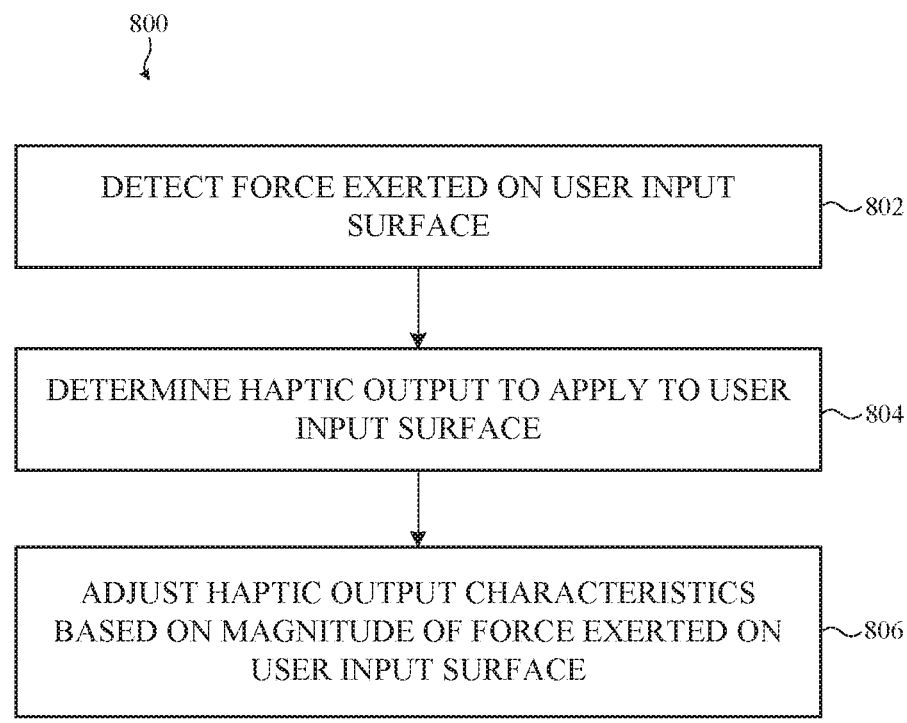
FIG. 8 is a flowchart depicting example operations of a method of providing haptic effects that varies with force input using a haptic output system.

FIG. 8 is a flowchart depicting example operations of a method of providing haptic output that varies with force input using a haptic output system. The method depicted can, in some embodiments, be performed (at least in part) by the controller 402 depicted in FIG. 4. In other cases, the method is performed by another processor or circuit, or combination of processors or circuits.

The method 800 beings at operation 802 in which a force extorted on a user input surface of an electronic device (a, "force input") is detected and a magnitude (and/or location) of that force is determined. Typically, the force is quantified relative to a coordinate system associated with the user input surface.

Once the force is detected, one or more haptic effects associated with that force (e.g., location of force, direction of force, magnitude of force, and so on) can be determined at operation 804. More particularly, a haptic effect to apply to the user input surface, based on the force exerted, can be determined. As noted with respect to other embodiments described herein, the haptic output system can simultaneously actuate different haptic elements with different haptic output characteristics such that the aggregate output of the system is a unique haptic effect is perceivably different from the individual haptic outputs of the actuated haptic elements.

Next, at operation 806, one or more haptic outputs associated with the one or more haptic effects determined at operation 804 can be adjusted based on a magnitude (or other suitable property or change in property over time) of the force exerted on the user input surface and detected in operation 802. More particularly, in one example, an amplitude of a haptic output associated with a haptic effect can be increased in response to a high-magnitude force input (e.g., strong click in response to strong downward press of a simulated button). In another example, a duration of a haptic output associated with a haptic effect can be decreased in response to a high-magnitude force input (e.g., fast click of a switch in response to a strong press of a simulated key). In yet another example, a frequency of a haptic output associated with a haptic effect can be increased in response to a low-magnitude force input (e.g., low friction surface of an object when a user lightly grazes the object with a finger). It is appreciated that the examples provided above are not exhaustive and further haptic output characteristics and/or haptic outputs may be used and/or adjusted in any implementation specific or appropriate manner.

In this manner, haptic output and/or haptic effects provided by a haptic output system can be varied with or in response to force input received by a user input surface such as described herein.

Figure 9:
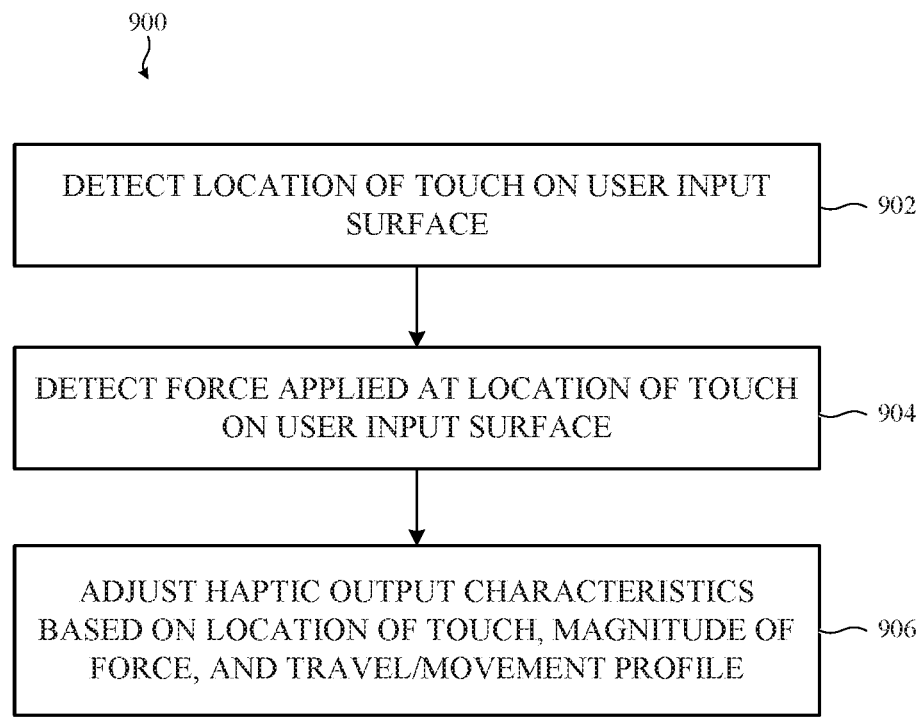
FIG. 9 is a flowchart depicting example operations of another method of providing haptic effects and output that vary with force input and touch input using a haptic output system.

FIG. 9 is a flowchart depicting example operations of another method of providing haptic output that varies with force input and touch input using a haptic output system. The method depicted can, in some embodiments, be performed (at least in part) by the controller 402 depicted in FIG. 4. In other cases, the method is performed by another processor or circuit, or combination of processors or circuits.

The method 900 beings at operation 902 in which a touch location is determined. As noted with respect to other embodiments described herein, the touch location can be quantified relative to a coordinate system describing a user input surface of an electronic device.

Once the touch location is determined, a force input exerted and/or applied on the user input surface at the touch location is detected and a magnitude of that force is determined at operation 904. As with the touch location determined at operation 902, the force is quantified relative to a coordinate system associated with the user input surface.

Next, at operation 906, one or more haptic outputs associated with the one or more haptic effects can be adjusted based on a magnitude (or other suitable property or change in property over time) of the force exerted on the user input surface and detected in operation 904.

In this manner, haptic output and/or haptic effects provided by a haptic output system can be varied with or in response to force input and touch input received by a user input surface such as described herein.

In addition, one may appreciate that although many embodiments are disclosed above, that the operations and steps presented with respect to methods and techniques described herein are meant as exemplary and accordingly are not exhaustive. One may further appreciate that alternate step order or, fewer or additional steps may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. An electronic device comprising:
   a user input surface configured to receive a user touch input and a user force input; and
   a haptic output system comprising:
      an array of vibrating haptic elements positioned relative to the user input surface; and
      a controller in communication with the array of vibrating haptic elements and configured to:
         independently actuate a first haptic element and a second haptic element of the array of vibrating haptic elements with a first haptic output characteristic and a second haptic output characteristic, respectively, to produce an aggregate haptic effect in the user input surface; and
         change at least one of the first haptic output characteristic or the second haptic output characteristic in response to the user touch input and the user force input; wherein the first haptic element comprises:
      an acoustic element disposed below the user input surface; and
      a post extending between the acoustic element and the user input surface.

2. The electronic device of claim 1, wherein:
   the aggregate haptic effect is a first aggregate haptic effect; and
   the controller is further configured to independently actuate a third haptic element and a fourth haptic element of the array of vibrating haptic elements with a third haptic output characteristic and a fourth haptic output characteristic, respectively, to produce a second aggregate haptic output effect in the user input surface.

3. The electronic device of claim 1, wherein the acoustic element comprises a voice coil.

4. The electronic device of claim 1, wherein at least one of the vibrating haptic elements of the array of vibrating haptic elements comprises a piezoelectric material.

5. The electronic device of claim 1, wherein the user input surface comprises glass.

6. The electronic device of claim 1, wherein:
   the first haptic output characteristic comprises a first frequency; and
   the second haptic output characteristic comprises a second frequency different from the first frequency.

7. The electronic device of claim 6, wherein the second frequency is a harmonic of the first frequency.

8. The electronic device of claim 6, wherein the change comprises increasing at least one of the first frequency or the second frequency.

9. A haptic output system comprising:
   a first haptic element positioned below a user input surface of an electronic device;

a second haptic element positioned below the user input surface and spaced apart from the first haptic element by a selected distance;

a controller configured to actuate the first haptic element at a first frequency to produce a first haptic output in the user input surface and to actuate the second haptic element at a second frequency to produce a second haptic output in the user input surface; wherein the first haptic output and the second haptic output generate an aggregate haptic effect in the user input surface;

the second frequency is an odd harmonic of the first frequency; and the controller is configured to vary the aggregate haptic effect based on real-time user touch input and user force input applied to the user input surface.

10. The haptic output system of claim 9, wherein the first haptic element comprises a piezoelectric element.

11. The haptic output system of claim 9, wherein the first haptic element is coupled to an internal surface of the user input surface.

12. The haptic output system of claim 9, wherein the first haptic output and the second haptic output are configured to interfere with one another to produce the aggregate haptic effect.

13. The haptic output system of claim 9, wherein the aggregate haptic effect comprises a square wave vibration of the user input surface.

14. A method of providing haptic output comprising:

receiving a touch input at a user input surface of an electronic device;

determining a location of the touch input relative to the user input surface;

receiving a force input at the user input surface;

determining a magnitude of the force input;

generating a first haptic output at a first frequency with a first haptic element coupled to the user input surface; and generating a second haptic output at a second frequency that is an odd harmonic of the first frequency with a second haptic element coupled to the user input surface, the second haptic output configured to interact with the first haptic output to produce an aggregate haptic effect; wherein a first haptic output characteristic of the first haptic output is based, at least in part, on the location of the touch input; and a second haptic output characteristic of the second haptic output is based, at least in part, on the magnitude of the force input.

15. The method of claim 14, wherein the second haptic element is selected from an array of haptic elements based on a distance between the second haptic element and the first haptic element such that the first haptic output generated at the first frequency and the second haptic output generated at the second frequency are in phase with one another.

16. The method of claim 14, wherein at least one of the first haptic output characteristic and the second haptic output characteristic are varied in response to movement of the touch input.

17. The method of claim 14, wherein at least one of the first haptic output characteristic and the second haptic output characteristic are varied in response to a change in the magnitude of the force input.

* * * * *